Feb. 19, 1935.  D. E. AUSTIN  1,991,536
VEHICLE AND SLEEPING BERTH CONSTRUCTION
Original Filed April 2, 1928
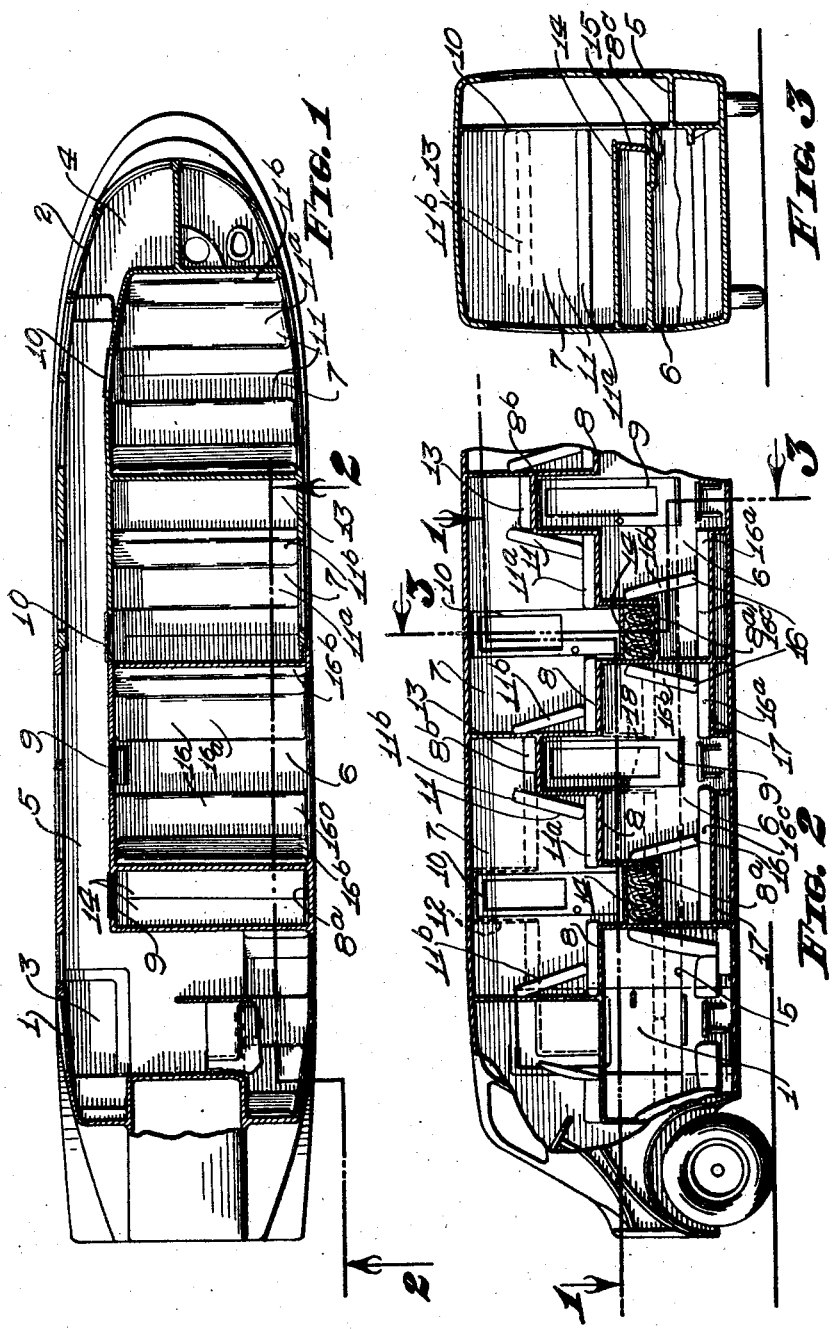
INVENTOR
DWIGHT E. AUSTIN
BY A. B. Bowman
ATTORNEY Patented Feb. 19, 1935

1,991,536

UNITED STATES PATENT OFFICE 1,991,536

VEHICLE AND SLEEPING BERTH CONSTRUCTION

Dwight E. Austin, Inglewood, Calif., assignor, by mesne assignments, to General Motors Truck Corporation, Pontiac, Mich., a corporation of Delaware Original application April 2, 1928, Serial No. 266,709. Divided and this application May 2, 1932, Serial No. 608,761

4 Claims. (Cl. 296—64)

My invention relates to vehicle and sleeping berth construction.

This application is a continuation and division of my patent application for Vehicle and sleeping berth construction filed in the United States Patent Office, April 2, 1928, Serial No. 266,709 now Patent No. 1,864,710. The objects of this application and the objects of this present invention are:

First, to provide a vehicle body whereby the sleeping passenger carrying capacity is improved over vehicles now in use with only slight increase of height of the vehicle body;

Second, to provide a vehicle having a plurality of compartments positioned on different levels and in staggered relation to each other and common means of ready access to each of said compartments from one side at both levels;

Third, to provide a vehicle structure of this class whereby access may be had to compartments at a higher level from a common corridor at one side of the vehicle without necessitating the placing of steps or a ladder or stool in the corridor to permit and facilitate ingress and egress to and from the compartments at the higher level;

Fourth, to provide a vehicle body structure having a plurality of compartments positioned at different levels in staggered relation to each other and provided with low seating compartments but with high standing compartments immediately to the side of the seating compartments adjacent the common corridors and the compartments at the different levels;

Fifth, to provide a structure of this class by continuous unbroken corridor from front to rear and passenger compartments to the side of the corridor, some of said compartments being positioned below the floor level of the corridor and others above the floor level of the corridor, the latter being positioned in staggered relation relative to the former, both the lower and the higher compartments being readily accessible from the common corridor;

Sixth, to provide a sleeping berth arrangement whereby the sleeping space particularly as employed in vehicles is doubled;

Seventh, to provide a sleeping berth arrangement whereby substantially four superimposed berths may be readily and conveniently accessible at all times from one side of the vehicle without the employment of auxiliary steps, ladders and the like;

Eighth, to provide a sleeping berth construction whereby a pair of superimposed berths may be formed in compartments at different levels and in staggered relation to each other and all communicating with and readily accessible to a common corridor;

Ninth, to provide a sleeping berth construction whereby each berth or each set of berths arranged in compartments at different levels may be provided with a dressing room immediately adjacent the berths and in the same compartment therewith;

Tenth, to provide an arrangement of sleeping berths in compartments positioned at different elevations, the portions of the compartments in which the berths are positioned being of less than ordinary standing height, but provided with portions immediately adjacent thereto permitting convenient standing room and forming dressing rooms for the adjacent berths;

Eleventh, to provide a vehicle body having a plurality of substantially private compartments arranged at different levels each having low sleeping spaces and high convenient standing and dressing spaces immediately outside of the sleeping spaces, the standing and dressing spaces communicating with the common corridor at the side of the vehicle;

Twelfth, to provide a structure of this class having adjacent compartments in which portions of some are positioned over portions of the others for economy of space and in which sleeping berths in the first are positioned over berths in the latter so that limited but private sleeping space is provided in each commensurate with the greatest economy of space;

Thirteenth, to provide a sleeping berth arrangement which is particularly adapted for automobile stages although the same may be readily applied to all other forms of vehicles used for transportation in which economy of space, privacy, and convenience is desired;

Fourteenth, to provide as a whole a novelly constructed vehicle body, a novel seating arrangement, a novel sleeping arrangement and a novel arrangement of such seats, berths and dressing rooms in adjacent compartments; and Fifteenth, to provide a structure and arrangement of this class which is simple and economical of construction, proportional to its functions, advantageous, convenient, compact, durable and attractive in appearance.

With these and other objects in view as will appear hereinafter my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a sectional view in plan taken at 1—1 of Fig. 2, showing my vehicle and sleeping berth construction in an automobile stage; Fig. 2 is a partial sectional and partial elevational view of the front portion of the vehicle taken at 2—2 of Fig. 1 and Fig. 3 is a transverse sectional elevational view taken at 3—3 of Fig. 2.

Like characters of reference refer to similar parts and portions throughout the views of the drawing.

It will be noted that the structure and vehicle shown is for an automobile stage or automobile stage coach particularly adapted for long distance travel and is of considerable length and is provided at the front and rear ends of one side with entrance and exit doors, 1 and 2 respectively. The entrance and exit platforms 3 and 4 on the inside of the body to which entrance may be made to the body from the outside through the doorways 1 and 2 respectively are as low as practicable and are preferably only a single step above the road. The corridor 5 is positioned at one side of the vehicle and in this instance it is shown at the right side forming substantially a direct connection between the front and rear entrance and exit door. The floor in the corridor 5 in this instance, is raised above the floor spaces or platforms immediately inside of the entrance and exit doors. Between the corridor 5 and the opposite side of the vehicle body are arranged the lower compartments 6 and the upper compartments 7 which are arranged above and in staggered relation with each other. The dividing wall between the lower and upper compartments consists substantially of a horizontal wall 8 having alternate downwardly offset portions or pockets 8a and upwardly offset portions or pockets 8b. The opposite portions 8a serve as foot space for the upper compartments 7 and increase the height therein to a convenient standing height, while the offset portions 8b serve as head clearance space so as to provide standing height for the lower compartments 6.

The compartments 6 and 7 may be closed and separated from the corridor by doors 9 and 10 which are positioned directly opposite the upwardly offset portions 8b and the downwardly offset portions 8a. The seats are positioned transversely with respect to the vehicle and the sleeping berths formed from the seats are also positioned transversely with respect to the vehicle. The seat cushions 11a of the seats 11 in the upper compartments rest preferably and directly on the upper sides of the main separating horizontal wall 8 at the opposite sides of the downwardly offset portions 8a and abut against the upwardly offset portions 8b at the inner edges of the seat cushions. The back forming cushions 11b which may rest upon the seat cushions 11a are positioned at the opposite sides of the upwardly offset portions 8b when forming the back rest of the seat and are adapted to be raised to horizontal positions as shown by dotted lines in Fig. 2 of the drawing for forming upper berths directly above the lower berths formed by the cushions 11a. The outer edges of the back forming cushions, when the same are raised to horizontal positions, may be suspended from the ceiling of the vehicle body by straps as shown by dotted lines and designated 12, in Fig. 2 of the drawing. At the upper side of the upwardly offset portions 8b are positioned other cushions 13 which together with the cushions 11b of one of the seats in each compartment form double upper berths. It will be noted, however, that each upper compartment includes preferably only one of such double berths so that the space within each of the compartments is substantially the same.

It will be here noted that when the upper compartments are used merely for seating the passenger, the full depth of the offset portions 8a may not be necessary for convenience in seating. Therefore a second higher bottom 14 may be provided in such downwardly offset portions. This bottom 14 may be in the form of a pair of narrow hinged members or doors which may be folded upwardly. The space below such floor doors may be utilized for storing bedding for the berths. When the bedding is removed, said floor doors may be lowered for increasing the head room when using the compartment for sleeping berths. The end wall of the compartment below the floor doors 14 as indicated by 15 in Fig. 3 may be also hinged, and when in an upright position as shown, may be employed to support the doors as a floor, and when folded downwardly, preferably into a recess designated 8c, will be out of the way and permit the floor doors to be folded downwardly.

The seats 16 are similar in construction to those in the upper compartments and consists of seat cushions 16a and back forming cushions 16b. The cushions rest on raised platforms or supports 17 which extend above the floor level of the lower compartments and are positioned at the opposite sides of the foot space or central aisle extending to and from the door. The back forming cushions 16b in the lower compartments may also be raised to a horizontal position as shown by dotted lines and forming the upper berths in the lower compartments, the same being supported by straps as shown by dotted lines and designated 18 when said cushions are used as berths.

It will be here noted that in the lower compartments all upper berths are single. However, the space below the downwardly offset portions 8a is utilized as a sleeping space. Therefore one of the seat cushions designated 16c is considerably wider than the other and extends to the space underneath the downwardly offset portion 8a and forms a double berth. The lower compartments are also so arranged that only one double berth is formed in each compartment. Thus five passengers may conveniently sleep in one compartment, providing maximum economy of space and also ample head room in each compartment commensurate with the low body construction and ready accessability at all times to all compartments, seats and berths.

It will be noted that the space immediately in front of the forward lower compartment at the side of the vehicle opposite the entrance may be utilized for forming a pair of single superimposed berths formed from opposite seats. It will also be noted that the toilet room may be located at the extreme rear end of the vehicle body and at one side as shown in Fig. 1.

Though I have shown and described a particular construction, combination and arrangement of parts and portions and particularly adaptation of my structure to automobile stages, I do not wish to be limited to the particular construction, combination and arrangement nor to the particular adaptation, but desire to include in the scope of my invention, the constructions, combinations, and arrangements substantially as set forth in the appended claims.

Having thus described my invention what I claim as new and desire to secure by Letters Patent is:

1. In a combined seating and sleeping berth vehicle structure of the class described, a body having entrance and exit means and floor spaces at said entrance and exit means slightly above the roadway, and having a corridor extending from front to rear along one side of the vehicle, the floor level of said corridor being positioned above the floor spaces of said entrance and said exit means and also having a plurality of compartments at the side of the corridor, some of said compartments being positioned at a high level and the others at a low level, the floor levels of the compartments at the lower level being substantially on the level of said first mentioned floor spaces and below the floor level of the corridor, the floor levels of the compartments at the higher level being positioned above the floor level of said corridor, and fixed steps arranged to the side of the normal walking space of said corridor permitting ready access to the compartments at both the lower and higher levels.

2. In a combined seating and sleeping berth vehicle structure of the class described, a body having entrance and exit means and floor spaces at said entrance and exit means slightly above the roadway, and having a corridor extending from front to rear along one side of the vehicle, the floor level of said corridor being positioned above the floor spaces of said entrance, and said exit means and also having a plurality of compartments at the side of the corridor, some of said compartments being positioned at a high level and the others at a low level, the floor levels of the compartments at the lower level being substantially on the level of said first mentioned floor spaces and below the floor level of the corridor, the floor levels of the compartments at the higher level being positioned above the floor level of said corridor, each of the compartments having a pair of seats having movable back forming portions, the back forming portions of said seats being adapted to be raised to horizontal positions for forming single berths and a pair of single berths formed by the seats below the upper berths.

3. In a combined seating and sleeping berth vehicle structure of the class described, a body having entrance and exit means and floor spaces at said entrance and exit means slightly above the roadway, and having a corridor extending from front to rear along one side of the vehicle, the floor level of said corridor being positioned above the floor spaces of said entrance, and said exit means and also having a plurality of compartments at the side of the corridor, some of said compartments being positioned at a high level and the others at a low level, the floor levels of the compartments at the lower level being substantially on the level of said first mentioned floor spaces and below the floor level of the corridor, the floor levels of the compartments at the higher level being positioned above the floor level of said corridor, and fixed steps arranged to the side of the normal walking space of said corridor permitting ready access to the compartments at both the lower and higher levels, each of the compartments having a pair of seats having movable back forming portions, the back forming portions of said seats being adapted to be raised to horizontal positions for forming single berths and a pair of single berths formed by the seats below the upper berths.

4. In a side aisle convertible sleeping and seating vehicle body, a corridor offset from the longitudinal center line of the body, with its outside boundary defined by the body side wall, a group of passenger compartments having a floor line below the floor line of the corridor, a second group of passenger compartments having a floor line above the floor line of the corridor, the compartments of one group being in staggered relation to those of the other, and each compartment extending transversely from the corridor across the vehicle center line to the body side wall opposite the corridor, and having therein transverse seats, the seat and back portions of which are adjustable relative to each other to provide a pair of superposed transversely arranged berths.

DWIGHT E. AUSTIN.